Nov. 16, 1926.
F. W. McREE
1,607,548
ATTACHMENT FOR TRIP PANS OF JAW TRAPS
Filed Feb. 19, 1926
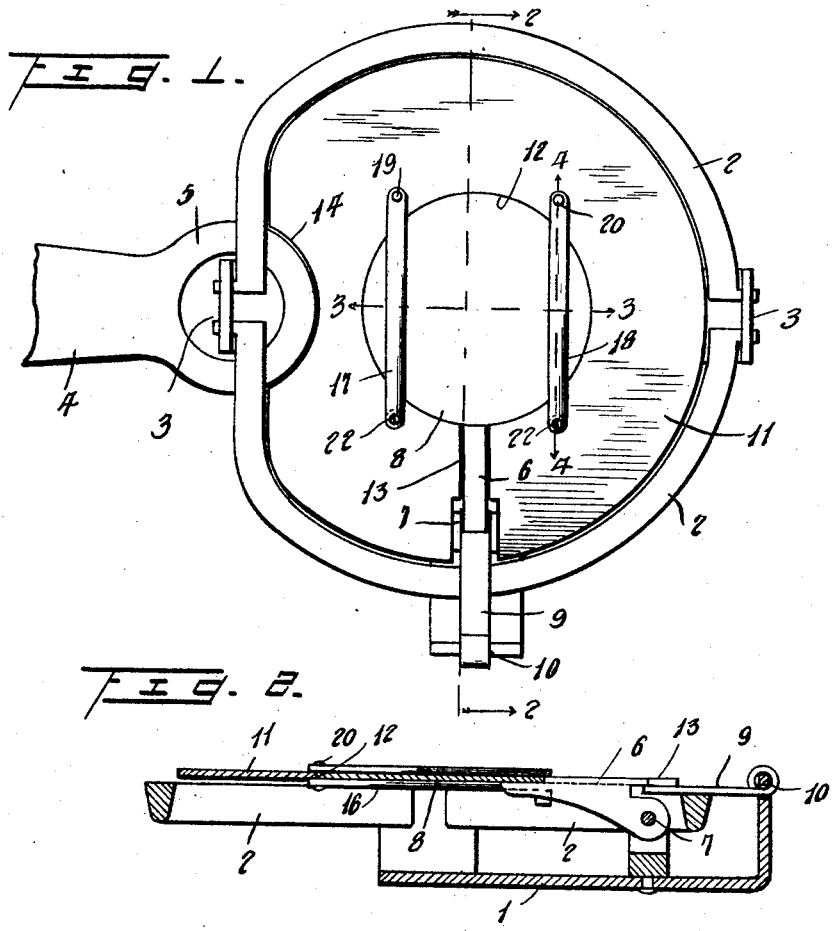
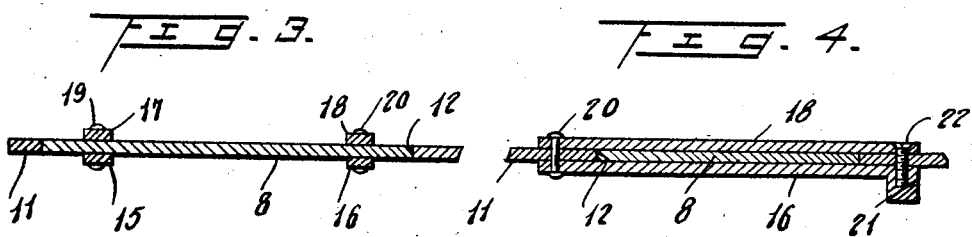
Inventor
F. W. McRee, Patented Nov. 16, 1926.

1,607,548

UNITED STATES PATENT OFFICE.

FRANK W. McREE, OF JEFFERSON, GEORGIA.

ATTACHMENT FOR TRIP PANS OF JAW TRAPS.

Application filed February 19, 1926. Serial No. 89,369.

This invention relates to jaw traps and more particularly to an attachment for the trip pans thereof. When a trap of this kind is set the distance between the edge of the trip pan and the inner sides of the jaws is so great as to permit an animal to step inside the jaws without touching the trip pan. This is a serious disadvantage for the reason that when it happens the trap is not sprung and the animal escapes.

The invention has for one of its objects to overcome this disadvantage and thus increase the efficiency of these traps and comprehends the provision of an attachment adapted to be carried by the trip pan and extend therefrom to within a short distance of the inner sides of the jaws so as to insure the springing of the trap in the event that an animal steps within the jaws.

A further object of the invention is the provision of an attachment which may be readily secured to the trip pan and which will not interfere with the setting and springing of the trap.

With the foregoing and other objects in view, the invention consists of the novel construction, combination and arrangement of parts hereinafter fully described and claimed, and illustrated in the accompanying drawing, wherein:

Figure 1 is a top plan view of a jaw trap equipped with an attachment constructed in accordance with my invention, Figure 2 is a sectional view taken on the vertical plane indicated by the line 2—2 of Figure 1, Figure 3 is a detail sectional view taken on the vertical plane indicated by the line 3—3 of Figure 1, and Figure 4 is a similar view taken on the vertical plane indicated by the line 4—4 of Figure 1.

Corresponding and like parts are referred to in the following description, and designated in the several views of the accompanying drawing, by similar reference characters.

The trap shown in the drawing is of well known construction and comprises a base 1, curved jaws 2 pivoted as at 3 to the base, a spring 4 carried by the base and having an eye 5 through which two of the ends of the jaws extend, a trigger 6 pivoted as at 7 to the base and carrying a trip pan 8, and a latch 9 pivoted as at 10 to the base and adapted to be engaged with the trigger and one of the jaws to hold the latter opened against the tension of the spring.

The attachment comprises a plate 11 which is provided with a central opening 12 for the reception of the trip pan 8 and a radial slot 13 for the reception of the trigger 6 and latch 9. The contour of the plate 11 is similar to that of the inner sides of the jaws 2 when the trap is set, and is provided with an edge recess 14 for the reception of the adjacent portion of the eye 5. The plate 11 is secured to the trip pan 8 by lower straps 15 and 16 and upper straps 17 and 18 which are arranged in pairs and contact with the upper and lower sides of the trip pan. The pair of straps 15 and 17 are pivotally secured to the plate 11 by a rivet 19 and the pair of straps 16 and 18 by a rivet 20. The straps 15 and 16 are provided at their free ends with downwardly extending and threaded bosses 21 with which are engaged screws 22 passing through the free ends of the straps 17 and 18 and through the plate 11.

From the foregoing and accompanying drawing, it will be apparent that since the plate 11 extends from the trip pan 8 to within a short distance of the inner sides of the jaws 2 it is impossible for an animal to step within the jaws without springing the trap. As the edge of the plate 11 is spaced from the inner sides of the jaws 2, and as the plate is provided with a slot 13 for the reception of the trigger 6 and latch 9 and recess 14 for the reception of the eye 5 of the spring 4, the plate will not interfere with the setting and springing of the trap. The straps 15—18 have a snug contact with the upper and lower sides of the trip pan 8 and plate 11, and due thereto the plate is held against any casual movement with respect to the trip pan. The plate 11 is preferably flat and the securing means therefor is adapted to support it on the trip pan 8 in the plane of said pan.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. An attachment for the trip pan of a jaw trap, comprising a plate provided with an opening for the reception of the trip pan, and means engaging the plate and trip pan to secure the former to and support it solely from the latter.

2. An attachment for the trip pan of a jaw trap, comprising a plate having an opening for the reception of the trip pan, and straps secured to the upper and lower sides of the plate and contacting with the trip pan to secure the plate thereto.

3. An attachment for the trip pan of a jaw trap, comprising a plate having an opening for the reception of the trip pan, straps pivoted to the upper and lower sides of the plate and contacting with the corresponding sides of the trip pan to secure the plate thereto, and elements engaging the free ends of the straps and plate to secure the straps against movement with respect to the plate.

4. In combination, a jaw trap, a member extending from the edge of the trip pan of the trap and provided with a slot for the reception of the trigger and latch of the trip pan and a recess for the reception of the free end of the spring of the trip pan, and means securing the member to the trip pan.

5. An attachment for the trip pan of a jaw trap, comprising a member adapted to increase the area of the trip pan, and means for securing the member to and supporting it solely from the trip pan.

6. An attachment for the trip pan of a jaw trap, comprising a flat plate provided with an opening for the reception of the trip pan, and means adapted to secure the plate to the trip pan and support the former in the plane of the latter.

In testimony whereof I affix my signature.

FRANK W. McREE.